June 26, 1934.   R. W. GOFF   1,964,464
CIRCUIT CONTROLLING DEVICE
Filed Jan. 26, 1934

Inventor:
Robert W. Goff,
by Harry E. Dunham
His Attorney.

Patented June 26, 1934

1,964,464

UNITED STATES PATENT OFFICE 1,964,464

CIRCUIT CONTROLLING DEVICE

Robert W. Goff, Schenectady, N. Y., assignor to General Electric Company, a corporation of New York Application January 26, 1934, Serial No. 708,450

6 Claims. (Cl. 175—336)

My invention relates to circuit controlling devices and has for an object the provision of a positively operated switch of rugged construction, the switch being characterized by the absence of links and pivot pins and a low value of power consumption.

In carrying out my invention in one form thereof, I provide a pair of laminated E-shaped magnets, the laminations of one of the magnets being arranged to provide a knife edge at one end of the magnet for pivotally supporting it with relation to the other magnet, the magnets being held together by means of a single spring.

Figure 1:
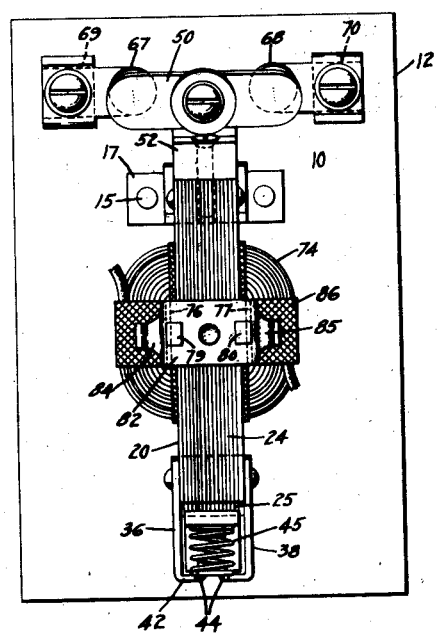
Figure 2:
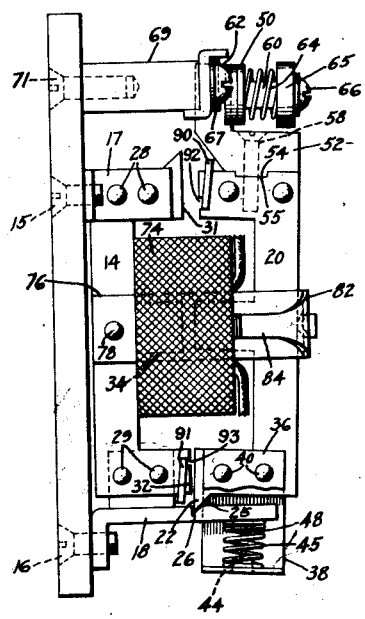

For a more complete understanding of my invention, reference should now be had to the drawing wherein I have shown in Fig. 1 a plan view of a switch embodying my invention, while in Fig. 2 I have shown a side elevation of the switch shown in Fig. 1.

Referring to the drawing, I have shown my invention in one form as applied to a circuit controlling switch 10 mounted upon a base 12 formed of insulating material. A stationary three-pole or E-shaped magnet core 14 of laminated construction is secured to the base 12 by means of screws 15 and 16 which extend into the brackets 17 and 18, whilst a second three-pole or E-shaped magnet core 20 of laminated construction is pivoted in the bracket 18 for movement between two circuit controlling positions. The magnets 14 and 20 are identical in construction, such identity of construction being a very desirable feature in reducing the cost of the circuit controlling device 10.

It will be observed that each lamination of the magnet 20 is provided with a pointed end 22 so that the plurality of laminations 24 form a knife-edge bearing 25 for the movable magnet 20. The knife-edge bearing 25 forms in conjunction with a notch 26 of V-shape provided in the bracket 18, a practically frictionless pivotal support between the E-shaped magnets.

The following procedure is particularly satisfactory in forming the V-shaped notch in the bracket 18 so that a minimum air gap exists between the pivoted ends of the magnets. The laminations 24 are assembled together and riveted into place by means of the rivets 28 and 29, the rivets 29 also serving to secure the bracket 18 to the stationary magnet 14. The magnet 14 is then placed in a milling machine and a cutting gear having outer teeth of exactly the same dimensions as the knife-edge bearing 25 is applied to the bracket 18. As the notch 26 is formed the cutter is arranged to remove a very slight amount of material from the outer ends 31 and 32 of the magnet 14 and to remove a relatively larger amount of material from the middle leg 34 of the magnet, smooth surfaces being thereby formed on the respective legs or poles 31, 32 and 34 of the magnet 14.

In order to mount the movable magnet 20 in position, a pair of members 36 and 38 are secured to the magnet 20 as by the rivets 40, the outer ends 42 being provided with inwardly extending projections 44 arranged to provide a spring seat for one end of a compression spring 45. The opposite end of the compression spring encircles a projection 48 struck from the upper end of the bracket 18. The compression spring 45 located a substantial distance from the bearing notch 26 strongly biases the movable member 20 to the open circuit position and also biases the knife-edge 25 into the notch 26.

A movable bridging member 50 is secured to the opposite end of the movable magnetic core 20 by means of an insulating support 52 having a projection 54 slidably engaging a U-shaped notch 55 formed in the face of the magnet 20. A fastening screw 58 extends through the insulating support 52 and into the face of the magnet 20. The bridging member 50 is slidably mounted on a post 60 which is rigidly secured to one end 62 of the insulating support 52, a compression spring 64 having one end bearing against the bridging member 50 and its opposite end held in place by means of a washer 65 secured to the post 60 by means of a screw 66. A pair of stationary contacts 67 and 68 are mounted on posts 69 and 70 secured to the base 12 by screws 71, the spring 64 providing a lost motion connection between the bridging member 50 and the movable magnet 20 when the member 50 is operated into and out of engagement with the stationary contacts.

A single operating coil 74 is arranged about the middle pole 34 of the magnet 14 and extends above the outer end of the pole 34. In order to secure the coil rigidly in place a pair of guide members 76 and 77, secured to opposite sides of the stationary magnet 14 by a rivet 78, are provided with narrow extensions 79 and 80 arranged to project through apertures provided in a resilient pressure member 82. In assembling the coil on the circuit controlling device, the coil is placed over the guide members 76 and 77, and the center pole 34 of the magnet 14. The movable magnet 20 is placed in position with its knife-edge bearing 25 in the notch 26 and the supporting and biasing spring 45 is mounted on its spring seats 44 and 48. To complete the assembly the pressure plate 82 is brought into position with its two resilient pressure arms 84 and 85 bearing against a strip of insulating material 86 secured to the upper face of the coil 74. By bending the extensions 79 and 80 towards each other, the pressure arms 84 and 85 are firmly pressed against the coil to hold it in position and prevent vibration thereof. The members 76 and 77 act as guides for the movable magnet 20, whilst the middle pole of the magnet 20 nesting within the coil 74 at all times prevents movement of the knife-edge bearing 25 from the notch 26.

In the operation of my invention, the coil 74 is energized with alternating current, the magnetic attractive effort exerted by the stationary magnet 14 operating the movable magnet 20 towards the stationary magnet 14 against the bias of the spring 45. As the bridging member 50 engages the contacts 67 and 68, the spring 64 is compressed by the movement of the post 60 through the bridging member until the outer poles of the magnets are operated into engagement with each other, a predetermined contact pressure being produced thereby. The middle poles of the magnets 14 and 20 do not engage each other, the relatively small air gap insuring the opening of the switch whenever the coil is deenergized. A pair of shading coils 90 and 91 mounted in the slots 92 and 93 of the magnet cores 14 and 20 prevent chattering of the magnet cores when in the closed circuit position.

Referring to Fig. 2, it will be observed that the knife-edge pivotal bearing for the movable magnet 20 is located so that the surfaces of the poles adjacent thereto are separated by only a relatively small air gap. By this arrangement a very strong attractive effort is exerted on the poles adjacent the bridging member 50 and the contacts 67 and 68. In a typical embodiment of my invention the movable magnet 20 was operated to and maintained in the closed circuit position with the coil consuming but two watts power, this particular switch being rated to carry 30 amperes, 125 volts.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is,—

1. A circuit controlling device, comprising a stationary laminated magnetic core, a movable magnetic core formed of a plurality of laminations, each of said laminations having pointed projections arranged to form a knife-edge bearing, a stationary switch member arranged adjacent said knife-edge bearing and having a notch provided therein for the reception of said knife-edge bearing, a spring for holding said cores together with said knife-edge bearing seated in said notch and for biasing said movable core to a predetermined position, and an operating coil associated with said laminated cores for operating said movable core from said predetermined position to another position.

2. A circuit controlling device, comprising a pair of relatively movable magnetic cores, each of said cores being formed of a plurality of laminations, the laminations of one of said cores having formed integrally therewith pointed projections to form a knife-edge bearing, a bracket secured to said other core having a bearing formed therein for the reception of said knife-edge bearing, resilient means for biasing said cores into a predetermined position with said knife-edge bearing seated in said bearing, an operating coil associated with said magnetic cores, and means for rigidly securing said coil in position against one of said cores and for guiding said other movable magnetic core for movement from said predetermined position to a second position when said coil is energized.

3. An alternating current circuit controlling device comprising a stationary E-shaped magnet formed of a plurality of laminations, a movable E-shaped magnet formed of a plurality of laminations, each lamination of which is provided with a pointed end to form in conjunction with the pointed ends of the other laminations a knife-edge bearing, a bracket secured to said stationary magnet and having a notch formed therein to receive said knife-edge bearing, a spring cooperating with said bracket and said movable magnet for biasing said movable magnet in a predetermined position and for biasing said magnets together with said knife-edge bearing seated in said notch, an operating coil for said circuit controlling device, means for rigidly holding said operating coil in position around the middle pole of said stationary magnet comprising a plate provided with pressure arms formed integrally therewith arranged to bear against one face of said coil, and a pair of guide members secured at one end to said stationary magnet, the opposite ends of said guide members having extensions cooperating with said plate for urging said arms against said coil.

4. A circuit controlling device comprising relatively movable E-shaped magnets formed by a plurality of laminations, the laminations of one of said magnets being provided with pointed projections which form a knife-edge bearing on one side of one pole of said magnet, a bracket supported by the corresponding pole of said other magnet having a notch for pivotally supporting said bearing, said notch and said bearing positioning said poles to form a very short air gap therebetween, a spring spaced from said bearing for biasing said magnets to a predetermined position, and an operating coil for said magnets for operating at least one of said magnets to a second position against the bias of said spring, said outer poles of said magnets then forming a closed magnetic circuit whereby the power required to operate said device is reduced to a minimum.

5. In combination with an electromagnet provided with a magnetic core, an operating coil having an opening through its center, of means for securing said coil to said core comprising a pair of guides secured to said core at one end and provided with extensions at the opposite ends, a pressure plate provided with resilient arms and with openings arranged to receive said extensions so that when said extensions are bent over against said pressure plate said resilient arms are forced against the coil to hold it securely in place.

6. In combination with an electromagnet provided with an E-shaped stationary magnetic core and an operating coil having an opening through its center, of means for securing said coil to said core comprising a pair of guides, one end of said pair of guides being secured to said core and the opposite end of said pair of guides being provided with projections, a pressure plate provided with an opening of substantially the same dimensions as said opening through said coil and with apertures for receiving said extensions, said pressure plate being provided with resilient arms whereby when said extensions are bent over against said pressure plate said arms are forced against said coil to exert a pressure thereon to hold securely said coil in place, a movable magnetic core provided with one leg arranged to move between predetermined positions through said opening in said plate, and means for limiting the movement of said movable core away from said pressure plate so that said extension cannot be moved beyond the outer surface of said pressure plate.

ROBERT W. GOFF.